(12) United States Patent
Possidento

(10) Patent No.: US 6,342,127 B1
(45) Date of Patent: *Jan. 29, 2002

(54) DISTILLATION DEVICE

(76) Inventor: William Possidento, 19 Karen Dr., Tinton Falls, NJ (US) 07753-7943

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/940,203

(22) Filed: Sep. 29, 1997

Related U.S. Application Data

(63) Continuation-in-part of application No. 08/762,717, filed on Dec. 10, 1996, now abandoned.

(51) Int. Cl.$^7$ .............................. B01D 3/10; C02F 1/14
(52) U.S. Cl. ............... 202/234; 159/903; 159/DIG. 15; 159/DIG. 16; 202/205; 202/267.1; 202/269; 203/86; 203/91; 203/DIG. 1
(58) Field of Search ....................... 203/10, 11, DIG. 1, 203/91, 86; 202/205, 269, 234, 267.1; 159/903, 904, DIG. 15, DIG. 16

(56) References Cited

U.S. PATENT DOCUMENTS

| | | | | |
|---|---|---|---|---|
| 2,424,142 A | * | 7/1947 | Bimpson et al. | 202/163 |
| 2,803,591 A | * | 8/1957 | Coanda et al. | 202/234 |
| 3,257,291 A | * | 6/1966 | Gerber | 202/234 |
| 3,300,393 A | * | 1/1967 | Fisher | 202/234 |
| 3,501,381 A | * | 3/1970 | Delano | 203/10 |
| 3,986,936 A | * | 10/1976 | Rush | 202/234 |
| 4,010,080 A | * | 3/1977 | Tsay et al. | 202/234 |
| 4,055,473 A | * | 10/1977 | Hay | 202/234 |
| 4,057,048 A | * | 11/1977 | Maine | 126/271 |
| 4,172,766 A | * | 10/1979 | Laing et al. | 203/11 |
| 4,221,466 A | * | 9/1980 | Neumann | 350/167 |
| 4,276,122 A | * | 6/1981 | Snyder | 203/10 |
| 4,504,362 A | * | 3/1985 | Kruse | 202/234 |
| 4,966,655 A | * | 10/1990 | Wilkenson, Jr. | 202/234 |
| 5,468,351 A | * | 11/1995 | Hirota et al. | 202/267.1 |
| 6,001,222 A | * | 12/1999 | Klein | 203/DIG. 1 |

FOREIGN PATENT DOCUMENTS

| | | | | |
|---|---|---|---|---|
| AU | 164679 | * | 8/1955 | 203/DIG. 1 |
| DE | 3531495 | * | 3/1987 | 203/DIG. 1 |
| DE | 3918427 | * | 12/1990 | 203/DIG. 1 |
| FR | 2707281 | * | 1/1995 | 203/DIG. 1 |
| JP | 0042833 | * | 12/1979 | 203/DIG. 1 |
| SU | 1312351 | * | 5/1987 | 203/DIG. 1 |

OTHER PUBLICATIONS

Roget's Interantional Thesaurus, Thomas Y., Crowell Co. New York 1834 p. 218.27218–4.*
Harold R. Hay "V–Cover Solar Stills" Preprint from sun at Work, $2^{nd}$ Quaters, 1966 pp. 1–4.*

* cited by examiner

Primary Examiner—Virginia Manoharan
(74) Attorney, Agent, or Firm—John P. Halvonik

(57) ABSTRACT

A distillation device including an enclosed tube of elliptical or circular cross section and having a top of an inverted shape so that the inverted portion points downward. The upper section of the outer tube should be of a material that permits the heating of the tube by solar radiation and allows solar radiation to enter the tube and heat the liquid inside. The lower portion could include materials that reflect radiation upward toward the liquid and may include absorptive materials. The apparatus includes a device for forming a vacuum and an element for focusing sunlight that enters the top of the tube upon the liquid inside the tube.

2 Claims, 4 Drawing Sheets

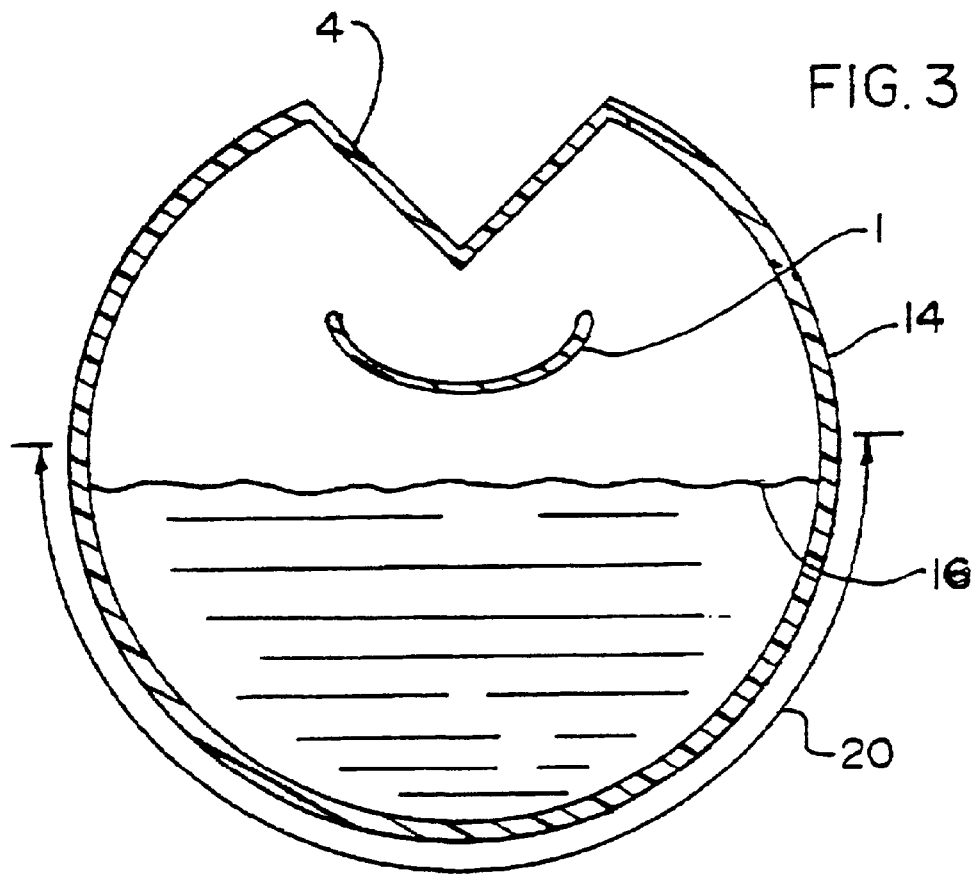
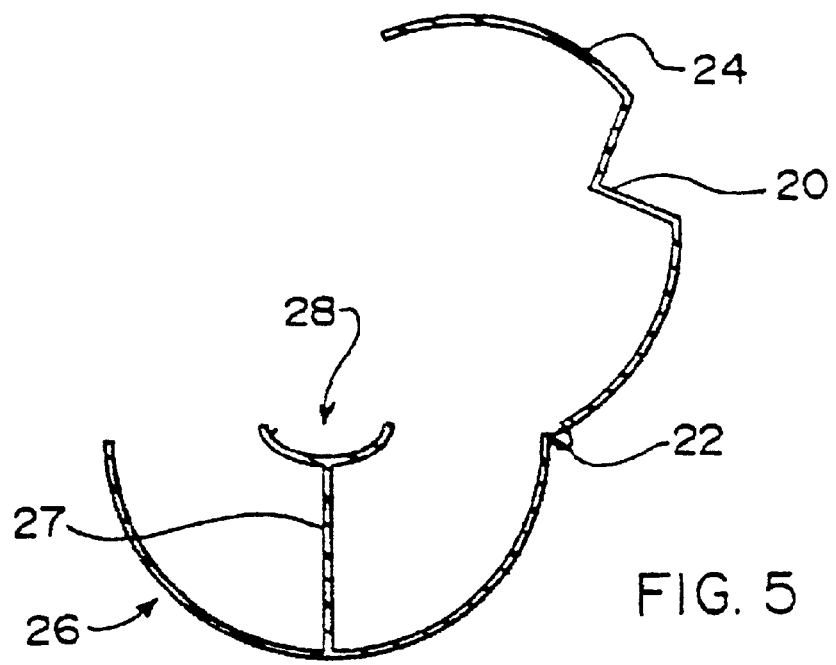

DISTILLATION DEVICE

This application is a CIP Ser. No. of 08,762,717 filed Dec. 10, 1996 now abandoned.

FIELD AND BACKGROUND OF THE INVENTION

The invention relates to the field of distillation apparatus and in particular to a distillation tube device having an enclosed tube portion for retention of heat and having an interior trough portion running the length of the tube portion in order to gather distillate from the walls of tube as water condenses.

PRIOR ART

While there are distillation devices that comprise tubes, there are none that applicant is aware of having the same construction including: a closed outer tube having an inverted top section for dripping the condensate and an interior trough that collects the distilled water as it comes off the top of the interior wall of the outer tube. Also, the construction includes the outer wall tube having an inverted top section which facilitates the gathering of the water by falling from the inverted section of the top of the roof or upper section.

SUMMARY OF THE INVENTION

A distillation device comprising an enclosed tube of elliptical or circular cross section. The outer tube has a top portion of approximately ⅓ of the total size of the tube. The top portion of the outer tube has an inverted shape so that the inverted portion points downward. The upper section of the outer tube should be of a material that permits the heating of the tube by solar radiation and allows the radiation to enter the tube and heat the liquid. The lower portion could comprise materials that reflect radiation upward toward the liquid and may include absorptive materials.

In addition, the outer tube may comprise materials that decrease the transmittance of solar rays in response to changes in sunlight or temperature to optimize the distillation. Inside the outer tube is a trough that runs the length of the tube and collects condensate, including purified water that condenses off the inside portion of the inverted top section. The device may find use in purifying saline water or other types of liquids. The device may be used to purify liquids that contain volatiles, such as hydrocarbons in which case the purified fraction would be in the main tube rather than in the trough; the volatiles being in the trough. Both trough and tube should be raised at one end in order to urge the liquid fractions toward one end of the device for collection.

It is an object of the invention to provide a distillation device that will be able to provide purified water or other liquids quickly and inexpensively and optionally using recyclable materials.

Another object of the invention to provide a distillation device that uses solar heating as a means for distilling and purifying liquids including water.

Another object of the invention to provide a distillation device having a closed environment so as to safely purify liquids containing volatiles, such as hydrocarbons, without releasing such into the atmosphere.

Another object is to provide a distillation device having an enclosed tube for the distillation of liquids, such tube is believed to facilitate the purification of liquids that may be contaminated with volatiles, e.g. hydrocarbons.

Another object is to provide a distillation device that can be quickly set up and disassembled as the need be in order to provide for the desalination of water, or purification of other liquids that contain volatile contaminants.

Other advantages will be seen by those skilled in the art once the invention is shown and described.

DESCRIPTION OF DRAWINGS

FIG. 3 version with one trough;

FIG. 5 shows a cross sectional view of hinged embodiment.

DESCRIPTION OF THE PREFERRED EMBODIMENT

Figure 1:
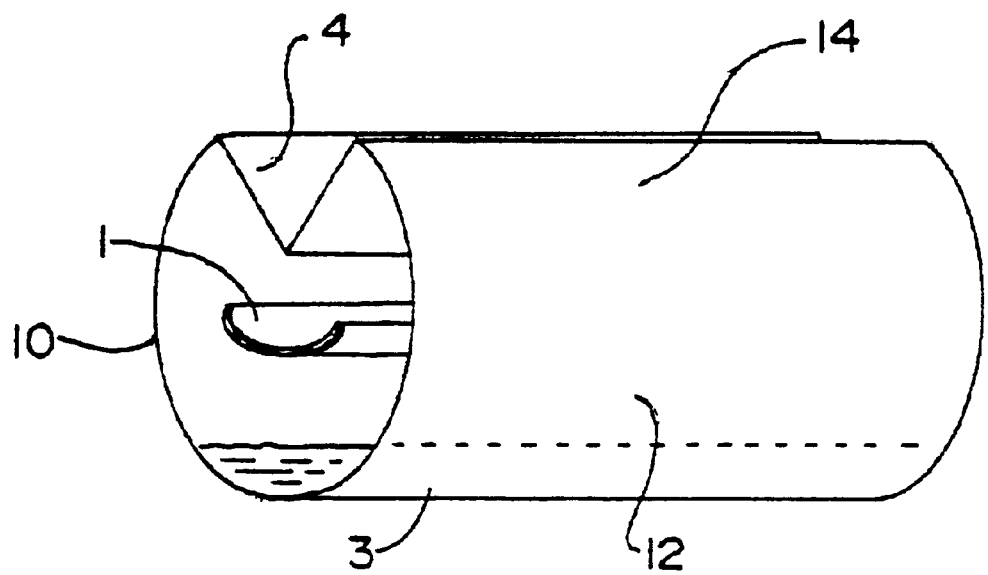
FIG. 1 Overall view of distillation tube.

The overall construction of the outer tube 10 and inner parts is shown in FIG. 1. The upper portion 14 of this tube has a portion 4 that is of inverted shape and this portion may be described as having a "V" shaped cross section so that the point of the "V" points downward toward the central axis of the outer tube. The arc length of this inverted portion would preferably be about 36°–120° of the circumference of the outer tube.

Figure 2:
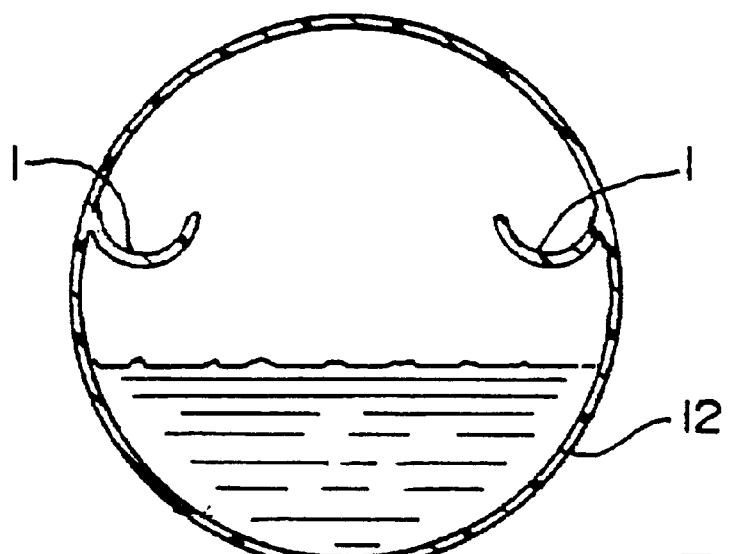
FIG. 2 cross sectional view with optional tube with dual troughs.

The lower portion 12 of this tube will hold the liquid 16 including water that may have salt in it (brine) or other liquids that need to be purified, see FIGS. 2–3. The main axis of the tube is defined as a line that runs through the middle of the tube and parallel to the sides. It is preferred that the cross section of the tube be of elliptical or oval shape.

FIG. 2 shows a cross section of one version of the distillation device where there are two trough sections 1 that run along the inner sides of the outer tube and are opposite one another. It is preferred that the troughs be located at a point about half way up the sides of the tube or a little higher and they should run about parallel to the main axis of the tube.

In that version shown in FIG. 3, the trough portion would run parallel to the main axis. This trough should be suspended from the tube so as to be above the liquid in the tube. It is believed that the trough will be at about the central axis of the tube or some distance above the central axis as shown in FIG. 3.

FIGS. 2 and 3 shows the outer tube having a liquid (liquid level shown as 16) inside. Such liquid will probably come about half way up the sides of the tube when the apparatus is initially in use. Greater or lesser volumes of liquid may be used.

Figure 4:
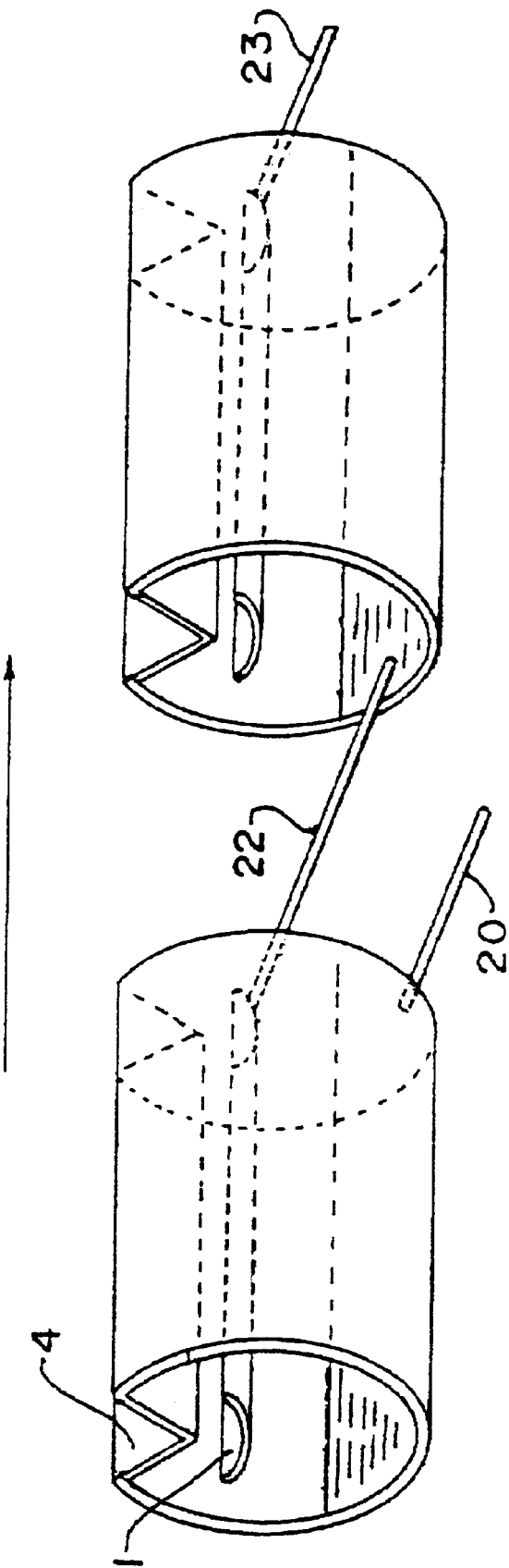
FIG. 4 tubes in series used in a distillation operation.

Another possible alternative embodiment is that shown in FIG. 5 that is a cross sectional view. This illustrates a hinged version of the invention in which the trough would be constructed as two halves, an upper half 24 and a lower half 26 with a hinged connection 22 between the two halves. The hinge, of course, allows the two halves to pivot in relation to one another. The division between the halves should be running parallel to the length of the trough so that the halves would form an upper and a lower half. shape of the upper half of the trough. In FIGS. 1, 3 and 4 the top of the trough is shown as a "V" shape. In FIG. 5 a "U" shaped type of indentation 20 is shown in the upper half of the trough. This "U" shape indentation may be used with those other embodiments shown in this application aside from the "V" shaped versions, that is, the "U" shape is not limited to use only with the hinged embodiment.

In the hinged embodiment, the upper half of the trough would be hinged to the lower half so that the U shape would be at the top of the upper half. The trough may be constructed in sections to facilitate the movement of the upper and lower halves. The use of the hinged connection would allow the halves to be separated from one another along the length for easier cleaning of the inside of the trough. The use of the hinge would also enable the user to tilt the upper half to one side (as shown) in order to empty the contents (which may include rain) of the external surface the U shape, i.e. that surface that is outside the trough and exposed to the elements, this in distinction to the internal surface.

The trough can also be constructed as an elevated trough 28 in FIG. 5. An extended portion 26 would extend upward from the bottom of the trough in order to support the trough at distance above the lower surface 26. Again, this embodiment can be used with any of the other embodiments shown in the invention and does not have to be used only with the hinged construction.

It is preferred that the bottom portion of the tube be coated with a reflective material 3 (see FIG. 1) that will reflect the rays of the sun upward and toward the liquid in the lower portion of the tube. Such coating may be reflective and this coating would preferably be on the outer surface of the lower portion of the tube. The coating may be on the outer surface in order to prevent contamination the liquid inside in the event that the material should corrode. This coating may be used with both versions shown in FIGS. 2 and 3.

The lower section should be of light transmissive material e.g. the upper section. In addition to the reflective coating; the lower section 12 may also be of a darker color like black or a similar color so as to encourage the absorption of heat on the lower portion of the tube. Again, it may be preferred that the coloring be on the outer surface of the tube. This construction of the lower section may be used on both versions shown in FIGS. 2 and 3.

It is preferred that the upper portion 14 of the tube, including the inverted section, be of a material that is transmissive to light so that radiation (like that from sunlight) can heat the liquid that is in the bottom portion of the tube as seen in FIGS. 2 and 3. This upper portion may be e.g. 144°–216° in arc length of the overall circumference of the tube so that this section is likely to be larger than the inverted portion itself. Such light transmissive materials include plastic, glass, and other transparent materials.

As another option, the upper portion of the outer tube may be coated with a material that will decrease the transmittance of radiation in the event that the outside surface of the outer tube becomes too hot to function or so hot as to pose a danger of explosion. Such materials may be chosen from materials that are used in modern eyeglasses, such as those that get darker when exposed to sunlight.

It is believed that certain transmissive materials may be said to be "photochromic" which means that the materials are designed to get darker in the event that they are exposed to sunlight. Such materials may contain impurities in the transmissive material that enables them to change in color in response to light. Those skilled in the art may attempt to find an optimum material for use in the invention through trial and error methods in order to find a combination that is suitable to prevent overheating of the tube. Such photochromic materials may be used in both versions.

Photochromic enhancement may be very desirable for chemical separations, such as the removal of gasoline from water. The photochromic properties would be desirable to achieve an optimum temperature that would maximize the volatilization and the condensation of the gasoline components while minimizing the volatilization and condensation of water. Prior art methods do not employ the use of photochromic properties.

Another option includes making the lower portion of the outer tube of parabolic construction so as to more precisely focus the sunlight upon the liquid in the tube. Line 20 in FIG. 3 shows approximate extent of this shape on the bottom portion of the tube. Another option includes the use of a vacuum means in connection with the inside of the tube in order to produce a vacuum (or at least an area of lower pressure) inside the device and so aid in the evaporation of the distillate. These options may be used on both versions.

A series of tubes may be set up for distillation and may be constructed as shown in FIG. 4. One end of both the outer tube and trough are of higher height than the other end so that as to encourage the flow of liquid from one end to the other through the action of gravity. This configuration shows how water distilled from brine, for example, coming though the left tube, may be further purified in the tube on the left. Such a set up may include several such distillation tubes in series as shown in FIG. 4. In the case of brine, the pipe at 20 permits drainage of reservoir. Pipe at 22 channels condensate 1 to the second unit to become reservoir 2 for subsequent distillation.

The purified liquid may then be collected at one end of the apparatus 23 as it flows through the apparatus. Each end of the tubes in the system should be closed. Smaller tubes such as 20, 22 and 23 in FIG. 4 will connect with a sidewall 10 in order to permit the intorduction or removal of fluid. The sidewalls or outer walls 10 may be constructed of glass or plastic or other materials found suitable for the purpose.

Among the advantages of using a tubular design similar to a pipe for the distillation device is that large amounts of liquids can be purified using the pipe for a continuous type of process with unpurified liquid continually being fed at the beginning of the pipe and the purified batch coming out of the other end. Distillation and transport of the liquid can occur at the same time in such a process. Prior art devices that utilize a simple container do not have the advantage of being able to be used in a continuous process.

Figure 6:
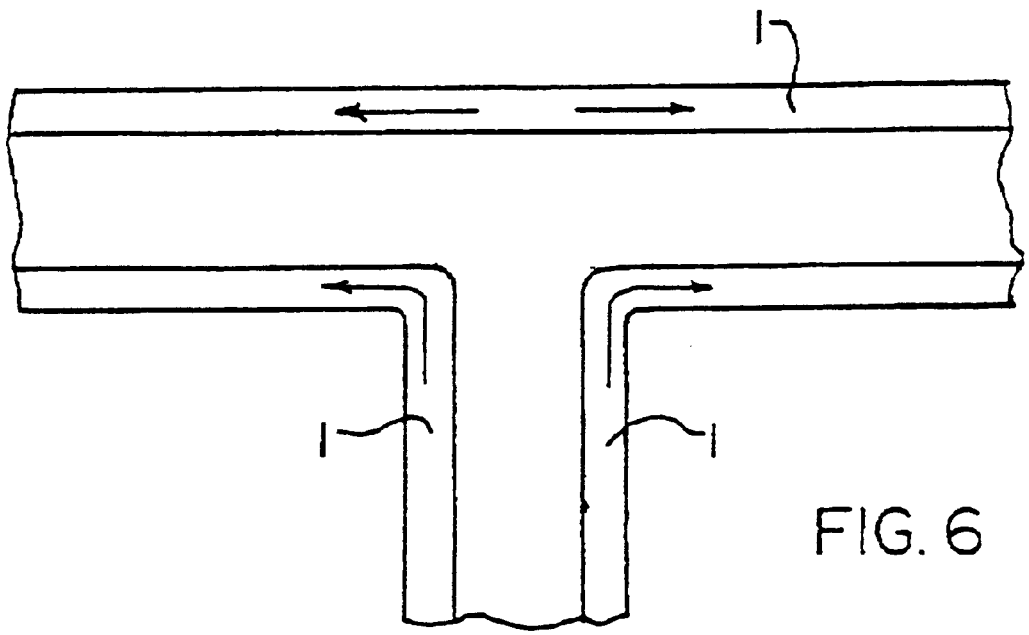
FIGS. 6 and 7 top view of alternate embodiment where a tube can be branched.
Figure 7:
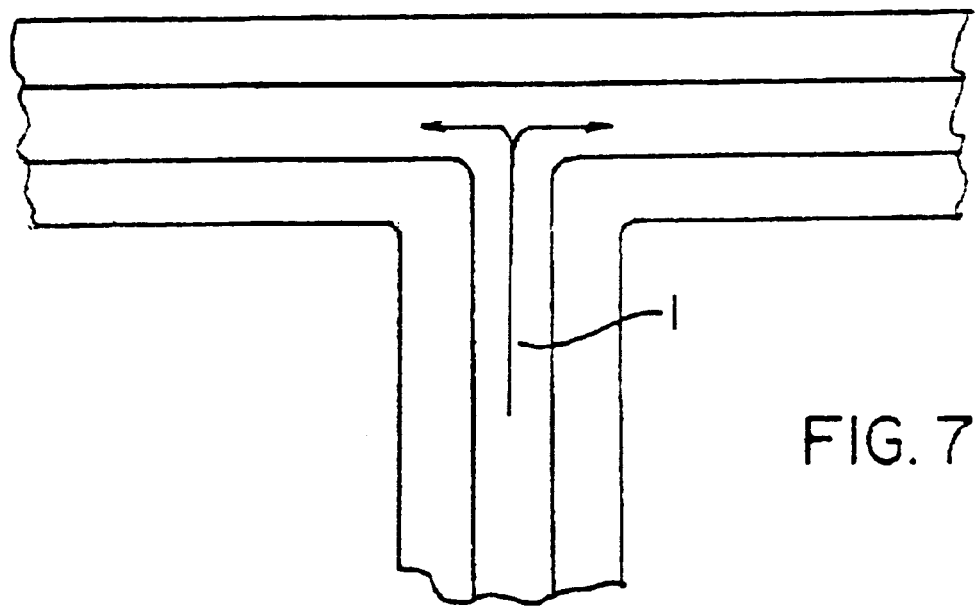

Branched tubes shown in FIG. 6 and 7 can be used to divide the flow of liquid and divert it to more than one location during the purification process. In both examples; this version of the tube would have a pair of side troughs running down each side of the tube e.g. the version shown in FIG. 2. One of the side troughs will branch to the left and one to the right at these "T" shaped branched portions. Further branching of each branch can be used to provide purified liquid to a variety of locations.

Use of the term "ovoid" in connection with the cross section of the tube is meant to include by definition both oval and circular-shaped cross sections.

I claim:

1. A distillation apparatus for use with solar radiation; said apparatus comprising: an enclosed tube for the flow of liquids, said tube having an inner surface and an outer surface and having a central axis running the length of said tube, said tube being of rigid construction and having an upper section and a lower section; said lower section for holding liquid in said tube; said upper section having an indented portion so as to form a "v" shaped section above said central axis of said tube, a trough portion in connection with the inner surface of said tube and running parallel to said central axis, said trough portion having a curved surface so as to collect liquids that condense on said upper section, said tube being of substantially air tight construction and having a means for reducing the pressure inside said tube; said trough portion having a midline bisecting the length of said trough and said midline being oriented at an angle with respect to horizontal so as to urge the flow of liquid in one direction; wherein said upper section is composed of a photochromic material so as to get darker in color in response to changes in the intensity of the solar radiation.

2. A distillation apparatus for use with solar radiation; said apparatus comprising: an enclosed tube for the flow of liquids, said tube having an inner surface and an outer surface and having a central axis running the length of said tube, said tube being of rigid construction and having an upper section and a lower section; said lower section for holding liquid in said tube; said tube being of substantially air tight construction and having a means for reducing the pressure inside said tube; said tube having a pair of trough portions running parallel to said central axis and each in connection with said inner surface of said tube, said trough portions located on opposite sides of said tube and said trough portions having a curved surface so as to collect liquids that condense on said upper section, said upper section having at least two indented portions and each of said indented portions disposed so that at least one said indented portion is above at least one of said trough portions, each of said trough portions being oriented at an angle with respect to horizontal so as to urge the flow of liquid in said troughs in one direction; wherein said upper section is composed of a photochromic material so as to get darker in color in response to changes in the intensity of the solar radiation.

* * * * *